E. J. PRINDLE.
MANUFACTURE OF ARTICLES HAVING A SYSTEMATIC RESEMBLANCE TO A PATTERN.
APPLICATION FILED APR. 27, 1918.
1,388,301.
Patented Aug. 23, 1921.
5 SHEETS—SHEET 3.
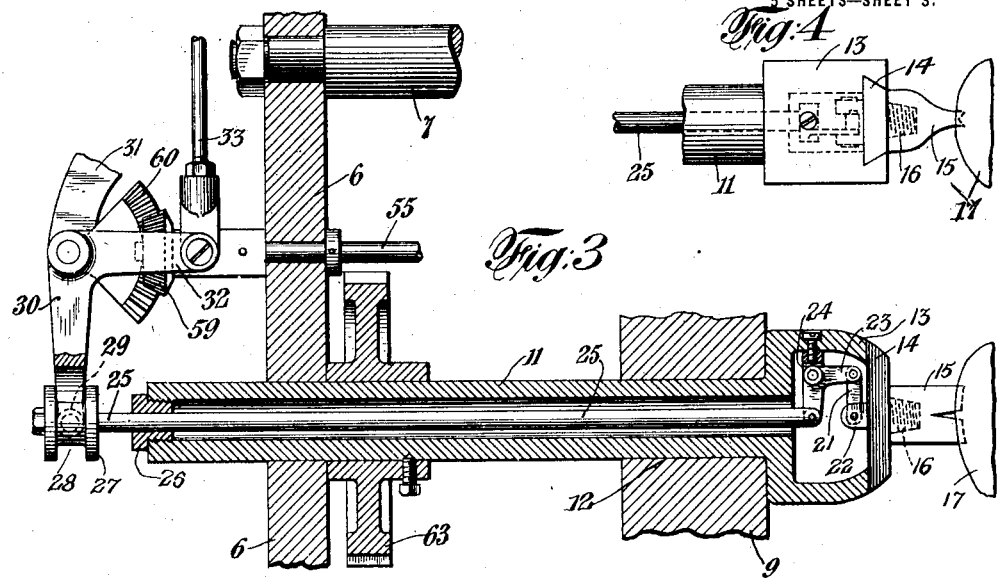
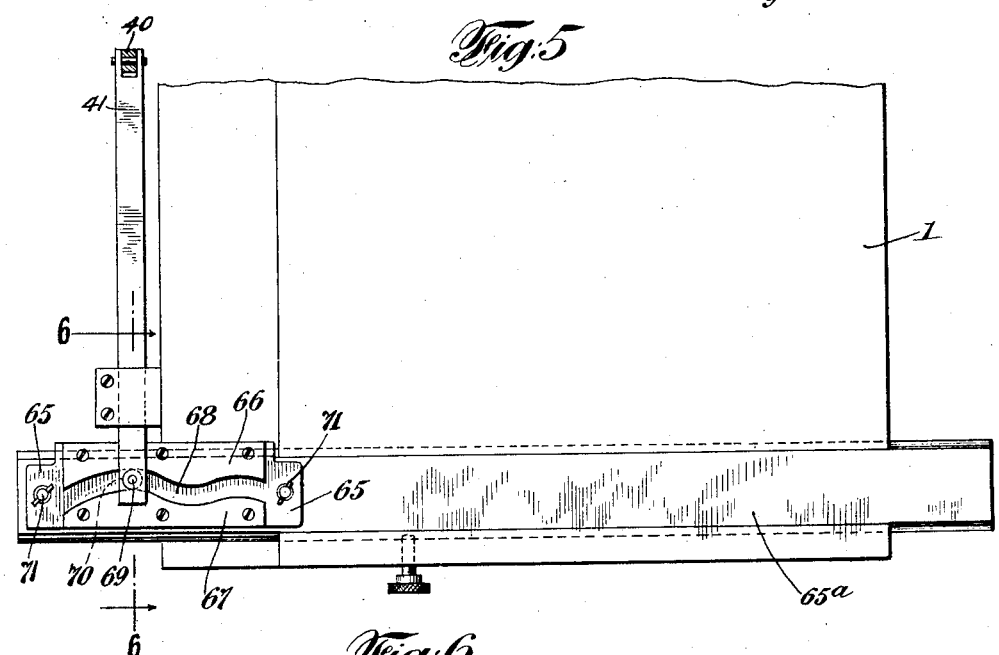
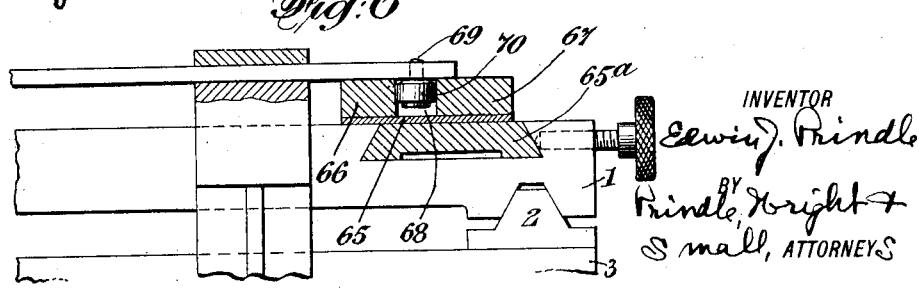
INVENTOR
Edwin J. Prindle
BY
Prindle, Wright & Small, ATTORNEYS E. J. PRINDLE.
MANUFACTURE OF ARTICLES HAVING A SYSTEMATIC RESEMBLANCE TO A PATTERN.
APPLICATION FILED APR. 27, 1918.
1,388,301.
Patented Aug. 23, 1921.
5 SHEETS—SHEET 4.
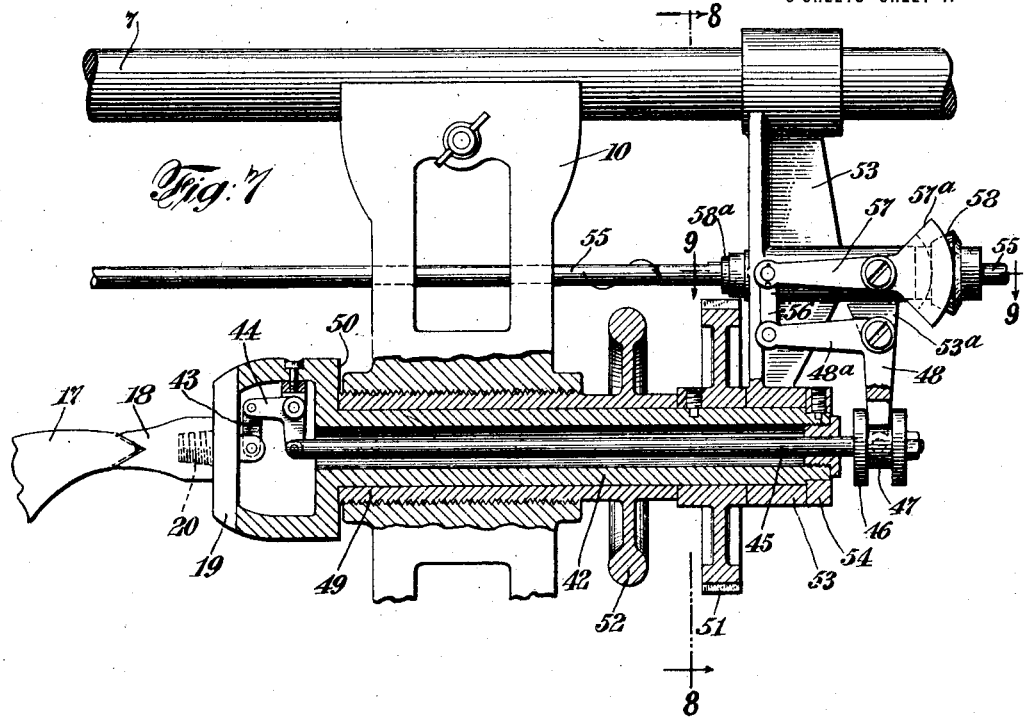
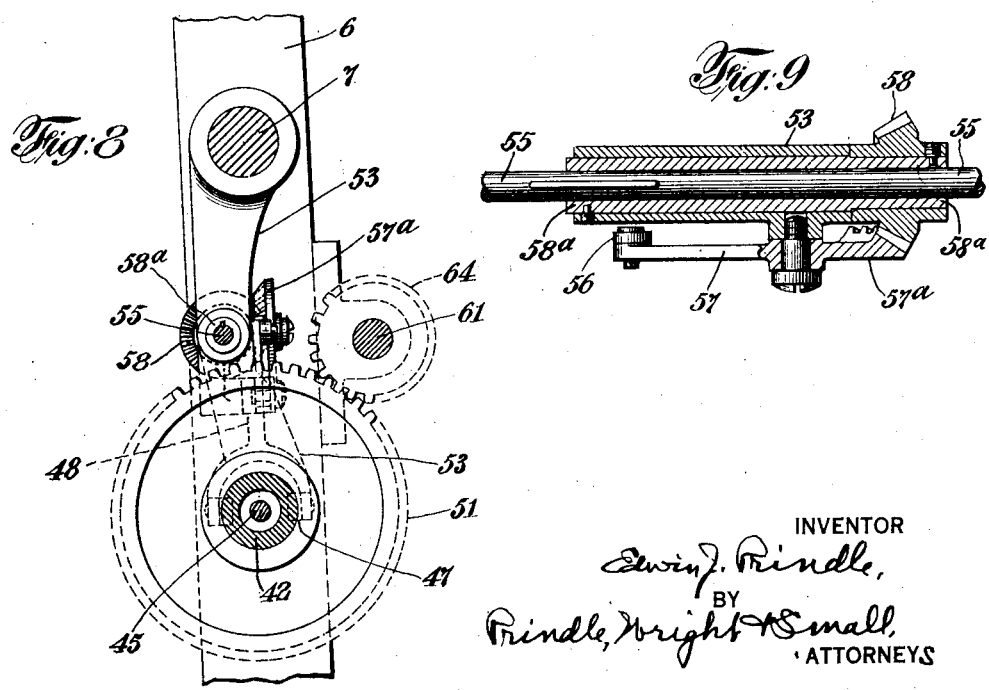
INVENTOR
Edwin J. Prindle,
BY
Prindle, Wright & Small,
ATTORNEYS E. J. PRINDLE.
MANUFACTURE OF ARTICLES HAVING A SYSTEMATIC RESEMBLANCE TO A PATTERN.
APPLICATION FILED APR. 27, 1918.
1,388,301.
Patented Aug. 23, 1921.
5 SHEETS—SHEET 5.
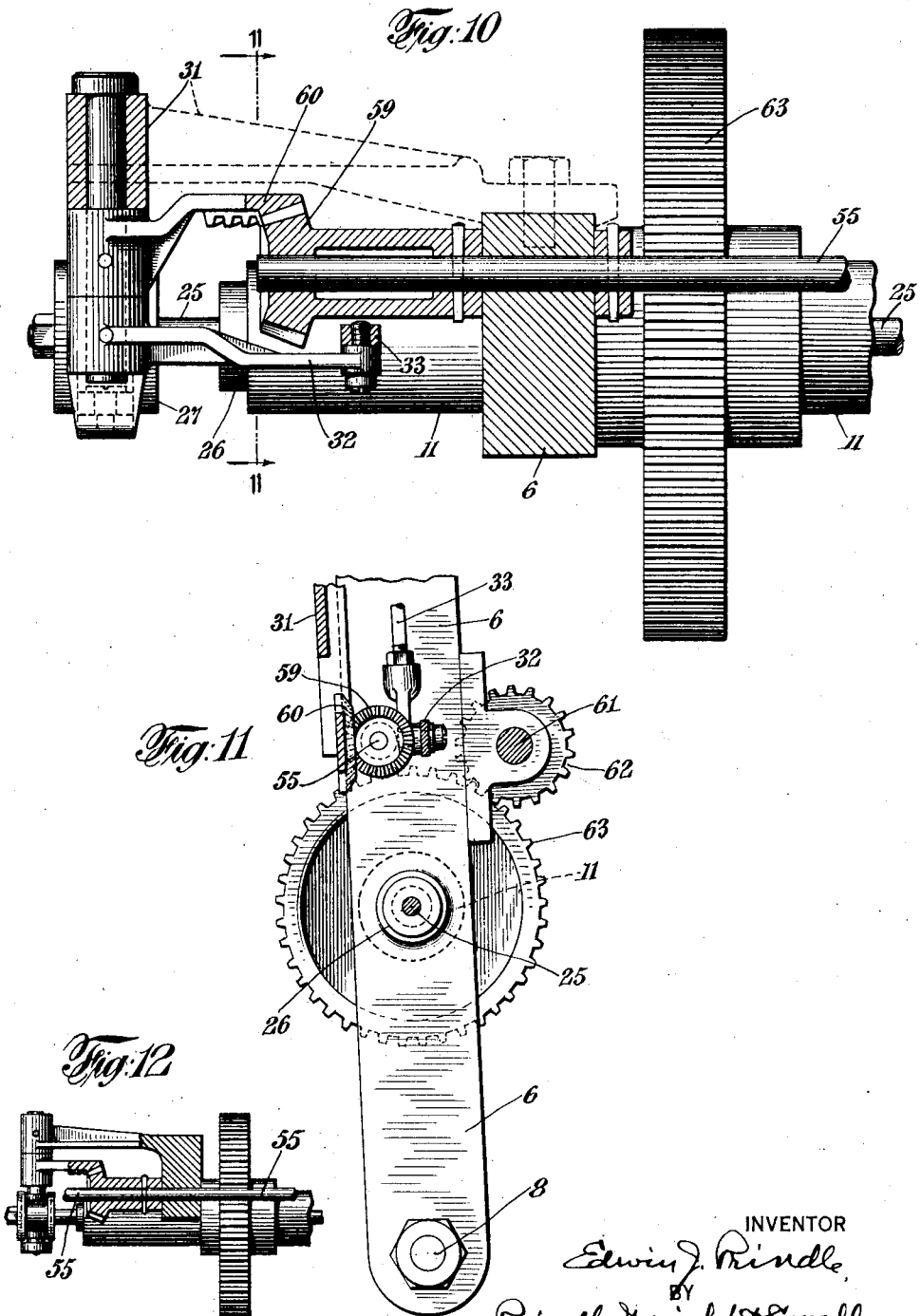

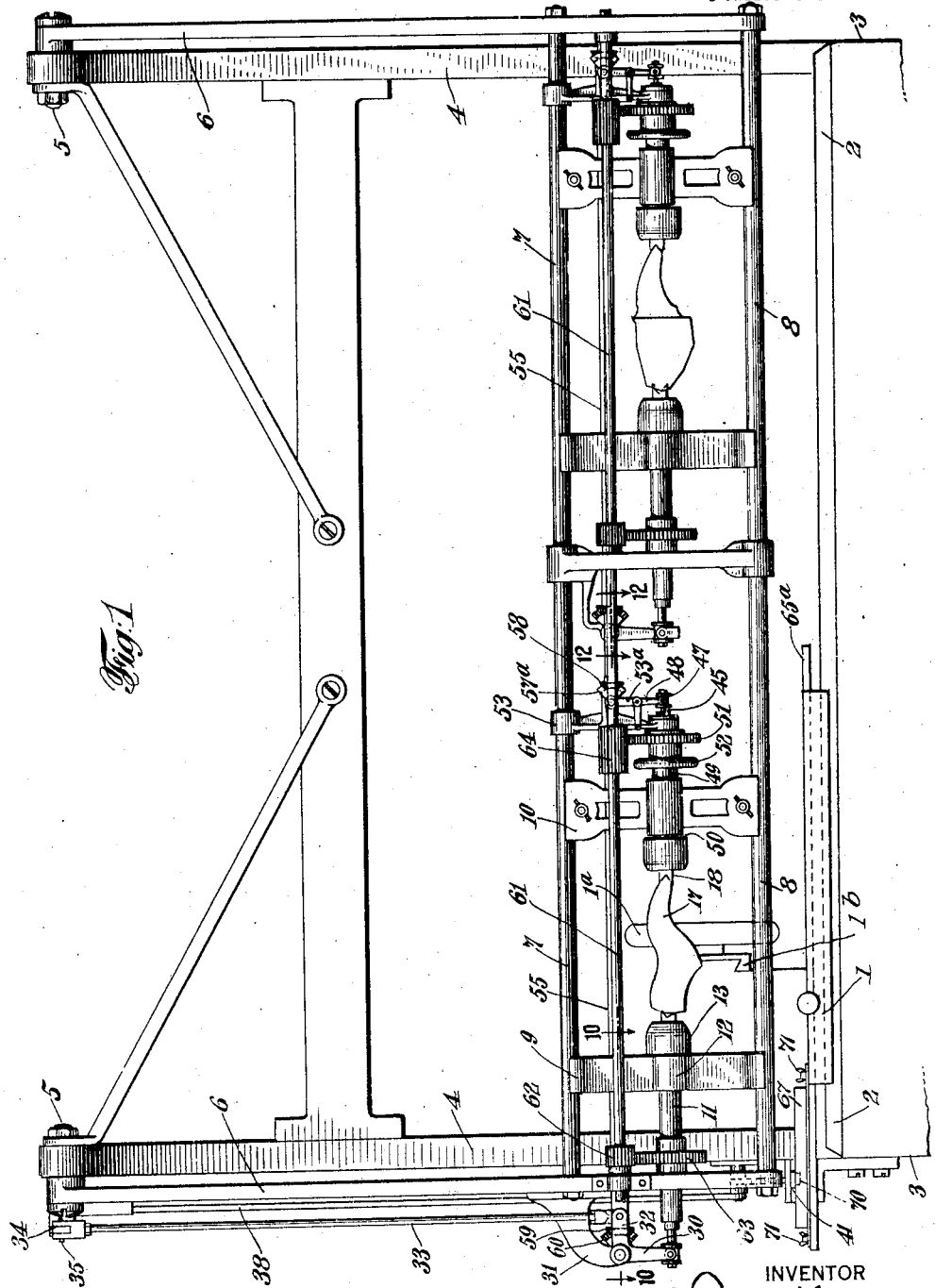

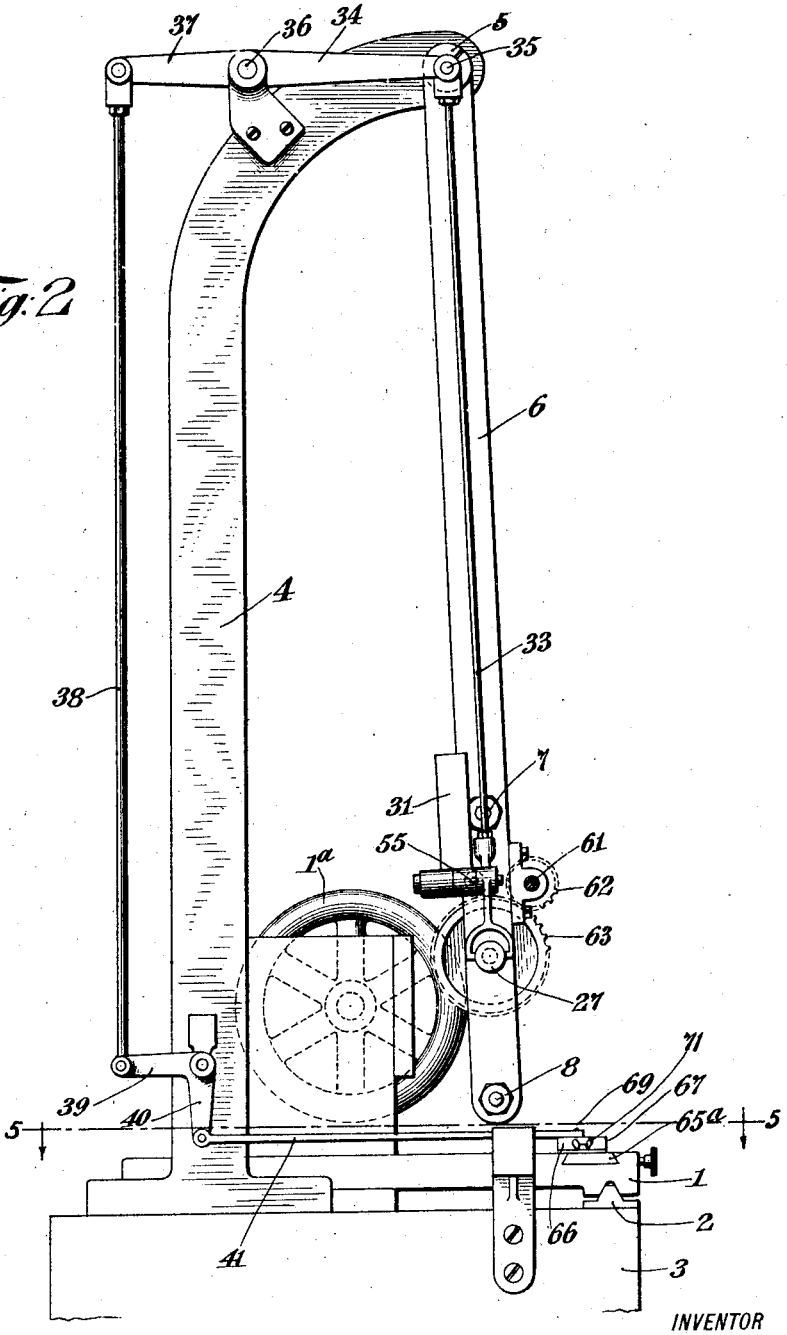

UNITED STATES PATENT OFFICE.

EDWIN J. PRINDLE, OF EAST ORANGE, NEW JERSEY, ASSIGNOR, BY MESNE ASSIGNMENTS, TO FITZ-EMPIRE DOUBLE PIVOT LAST COMPANY, OF AUBURN, MAINE, A CORPORATION OF MAINE.

MANUFACTURE OF ARTICLES HAVING A SYSTEMATIC RESEMBLANCE TO A PATTERN.

1,388,301.          Specification of Letters Patent.     Patented Aug. 23, 1921.

Application filed April 27, 1918. Serial No. 231,154.

*To all whom it may concern:*

Be it known that I, EDWIN J. PRINDLE, of East Orange, in the county of Essex, and in the State of New Jersey, have invented a certain new and useful Improvement in the Manufacture of Articles Having a Systematic Resemblance to a Pattern, and do hereby declare that the following is a full, clear, and exact description thereof.

This invention relates to pattern copying, or the production of objects having a systematic resemblance to a pattern used as a guide or templet, and is disclosed as embodied in a last lathe. Many of the principles and features of the invention are of broad application to the entire class of pattern copying machinery including the production of objects having less than three dimensions, such, for example, as patterns for soles, shoe uppers, clothing, etc., and accordingly I do not intend that all of the appended claims shall be limited in scope to pattern reproducing machinery of the last making or even of the three-dimensional type, and I have therefore in many of the claims, used words and terms in a generic sense as applying to the broad class of machinery of the pattern reproducing type.

As is well known, the operation of the ordinary width grading mechanism of the last lathe is unsatisfactory in some respects; for example, it distorts the sole profile of the model owing to the fact that it magnifies or reduces all lateral dimensions perpendicular to the axis of rotation in the same proportion. Since the ball is farther from the axis than the toe and heel, this changes the general curvature of the sole profile and causes poorly fitting lasts.

The first solution of the problem was given by L. B. Whipple, (United States Letters Patent No. 1,362,183, granted Dec. 14, 1920). While the machine shown in this application effected a revolutionary change in the treatment of the problem, it was subject to the disadvantage that the profile control obtainable by it was not arbitrary at all parts of the last.

The invention described and claimed in United States Letters Patent No. 1,362,184, granted Dec. 14, 1920, on my application introduced a continuous cam-operated control feature as an improvement, and made the treatment of the problem more flexible and more convenient. Both of these inventions involved, in one aspect, shifting the model relatively to the grading axis (which, in a last lathe, is the axis of revolution). This effected a change in the distances from points in the profile that it was desired to control to the grading axis. It is these distances that are graded, or magnified or reduced by the grading mechanism, and by effecting the proper displacement of any lamina at the instant of its reproduction, an arbitrary profile can be produced in the work, the model being so displaced that the resulting radius from the profile point being reproduced to the grading axis magnifies into the result desired in the work. Both of the machines so far discussed were subject to the disadvantage that they caused a slight distortion of the last, independently of that due to the profile control mechanism, due to the fact that the shift was accomplished by moving only one end of the model, so that the differential elements reproduced were not all strictly parallel. The invention described and claimed in United States Letters Patent No. 1,362,185, granted Dec. 14, 1920, on the application of S. E. Boynton supplied the improvement of moving both ends of the model simultaneously, securing accurate parallelism, if desired, between the differential elements reproduced.

The machines thus far discussed are subject to the disadvantage that the displacement required at any lamina depends not only upon the normal profile radius, that is, the radius characteristic of the unshifted model, but also depends upon the grading ratio which changes with every width. It was necessary therefore to use a different cam (or setting in the Whipple machine) for every width of every style.

An important object of the present invention is the obviation, among other difficulties heretofore met with in profile control, of the necessity of designing a special cam for every width of every style. The present invention provides for the use of a single cam for all lasts of the same style, irrespective of width. I have found that the profile of the model can be reproduced through shifting the model by an amount which does not depend upon the grading ratio, but only upon the normal radius vector of the profile point in the lamina being reproduced; a quantity differing only arithmetically (rather than geometrically) from this radius vector, which will be hereinafter called $e'$; or in more exact language, by shifting the model by $e'$ plus a constant K, which may be positive, negative or zero. This procedure insures that the profile point in the lamina being reproduced will be at a fixed distance (which may be zero) from the mechanical axis of revolution, and therefore that the model profile will be reproduced exactly in the block, though displaced from its normal relation to the mechanical axis of revolution by the quantity $r$K. The width grading of individual laminæ is not affected by this.

This procedure, being the same for all widths, can be mechanically accomplished by the use of a single cam, and I have discovered that the actual model profile can be used as such a cam.

Broadly, the invention contemplates the movement of a model transverse to a grading axis (in the illustrated machine, this axis is its mechanical axis of revolution) so that that point of a selected contour or profile which lies in the differential element or lamina being reproduced, will be at a given constant distance from the grading axis at the instant of reproduction. In the application of the present invention to toe spring control, this profile will be the longitudinal sole profile and the constant distance preferably may be zero.

The invention contemplates also an accompanying movement of the same nature on the part of the work. The corresponding profile points of the model and work are thus in the same arithmetical relation to the mechanical axis of rotation at the instant of reproduction and the profile will therefore be accurately reproduced.

Accordingly, an important feature of the invention resides in means for arbitrarily shifting both the model and work on their corresponding grading axes and preferably so that the portions of corresponding selected profiles of the model and work which are being operated on by the model wheel and cutter respectively will be always at the same distance from the axes.

Another important feature of the invention resides in mechanism for producing such shifting movement comprising a single cam used in the production of work of all graded dimensions. This cam is shaped directly from the contour with relation to which the shifting is done, and in the toe spring control problem is the actual sole profile of the model.

The foregoing general remarks will be more fully understood by the following description of my invention in its practice by means of a preferred machine embodying the machine-aspect of the invention, it being understood that the scope of the appended claims is not to be limited by the structure or function of the machine shown in the drawings, this being only one of a number of possible machines by which my invention may be practised, selected for purposes of illustration.

In the accompanying drawings—

Figure 1 is a partial front elevation of a lathe embodying my invention, only those parts which are changed by my invention being illustrated;

Fig. 2 is a side elevation of Fig. 1;

Fig. 3 is a view partly in cross-section of the head-stock spindle and adjacent parts;

Fig. 4 is a plan view of a portion of Fig. 3; and,

Fig. 5 is a horizontal sectional view of Fig. 2 taken on the line 5—5;

Fig. 6 is a detail cross section through line 6—6 of Fig. 5;

Fig. 7 is an enlarged detail, parts being in section and parts being in elevation, of the tail stock spindle;

Fig. 8 shows a detail vertical section on line 8—8 of Fig. 7;

Fig. 9 is a detail horizontal section on line 9—9 of Fig. 7;

Fig. 10 is an enlarged horizontal section taken through line 10—10 of Fig. 1;

Fig. 11 is a vertical section cut on line 11—11 of Fig. 10;

Fig. 12 is a horizontal section on the line 12—12 of Fig. 1.

In the illustrated embodiment of the invention, I have shown a last lathe with an ordinary model-wheel carriage 1 having a model wheel $1^a$ thereon, mounted on the usual guide or way 2 on a bed 3. The model wheel is mounted on the usual width grading slide $1^b$. Uprights 4 rise from the bed and carry pivots 5 of swing-frame side-bars 6. The swing frame, as usual, carries parallel guide bars 7 and 8 on which are mounted a head stock 9 and a tail stock 10. A head stock spindle 11 is mounted in a bearing 12 in the head-stock and in a bearing formed in the side bar 6. The head-stock spindle is provided with a hollow head 13, having a slide 14 mounted in a transverse guideway in the head, which slide has a heel dog or chuck 15 attached thereto in any manner desired. In the present instance, the heel dog is illustrated as screwed on a tapered screw 16. The heel dog carries the rear end of the model last 17, whose toe is mounted on a toe dog 18 which is mounted on a slide 19 similar to the slide 14 of the tail stock spindle, by a screw 20.

A more exact statement of the problem in general quantitative form may be of assistance at this point. The predecessors of the present invention, in order for example to reproduce the sole profile of the model, shifted the model preferably continuously, relatively to its axis of rotation in the lathe in such a way that (assuming that a last wider than the model is being cut) the radius vector drawn in the lamina being reproduced at any instant from the actual axis of rotation to the longitudinal sole profile would be shortened sufficiently so that when multiplied by the width grading ratio it would yield the radius vector of the same point measured from the normal or ordinary main longitudinal axis of the last—the axis around which the last has been rotated under ordinary practice. To reduce this to an exact statement, let $e'$ be the radius vector to the sole profile point in the model, measured from the ordinary "normal" axis, and let $r$ be the width grading ratio. Then the model was to be raised on the mechanical axis of rotation a distance $x$ such that $$(e'-x)\,r = e'$$

whence $$x = e'\,\frac{r-1}{r} = e'\left(1-\frac{1}{r}\right).$$

The shift $x$ therefore depended not only upon the part of the last being reproduced, but also upon the width grading ratio as above stated, and the cam by means of which it was accomplished had to be redesigned for every width of every style. It should be noticed that since $r$ lies between .9 and 1.2 in general, $1-\frac{1}{r}$ will be a small fraction.

I shall show that the profile of the model can be reproduced by a shift depending only upon $e'$, or the shape of the model itself, irrespective of the width.

In the herein described instance of the present invention I wish to so shift the heel dog 15 and toe dog 18 that the last will always be parallel with itself, and that the sections or laminæ of the model last successively operated upon by the model wheel shall have their sole portions at a uniform distance from the axis of revolution at the moment each section is being operated upon by the model wheel. This will require that the heel dog 15 and the toe dog 18, and the slides upon which they are mounted, shall be constantly shifted during the turning of the last. In order to so shift the said dogs during the turning operation, I provide the following mechanism: A link 21 is pivoted to ears 22 on the rear of the slide 14 at one end, while the other end of the link is pivoted to a bell crank 23 that is fulcrumed in ears 24 formed or fastened within the head 13. The opposite end of the bell crank is pivoted to a rod 25 running through a bore in the head-stock spindle 11, and passing through the gland 26 at the rear thereof. The spindle 25 carries a collar 27 having a groove 28 formed therein, and in this groove is engaged a pair of pins or rollers 29 carried by a furcated arm 30 of a bell crank, which bell crank is pivoted upon a bracket 31 fastened to the swing frame. The other arm 32 of the bell crank is pivoted to a rod 33, which extends upward along the bar 6 of the swing frame, and is pivoted to one arm 34 of a lever by a pivot 35, the pivot 35 being located approximately in line with the pivot 5 of the swing frame, so that the motion of the swing frame will not cause substantial motion of the rod 33. The lever 34 is fulcrumed to a bracket 36 on the frame, and its rear arm 37 is connected by a rod 38 with an arm 39 of a bell crank on the main frame, the other arm 40 of the bell crank being pivoted to a rod 41 adapted to slide horizontally forward and back in stationary guides on the main frame. The bar 41 is provided with means to engage a cam to be actuated from the model-wheel carriage, as will be later described.

The tail-stock spindle 42 is provided with a link 43 similar to the link 21, and with a bell crank 44 similar to the bell crank 23, the bell crank 44 being operated by a rod 45 similar to the rod 25, the rod 45 carrying a collar 46 similar to the collar 27, which collar is engaged by pins 47 on the vertical arm of the bell crank lever 48.

The tail-stock spindle is mounted in a screw sleeve 49 which is threaded in a bore in the tail-stock 10. The forward end of the screw sleeve bears upon the rear face 50 of the spindle head, and the spindle has a gear 51 fastened on it so that its hub bears against the rear end of a hand wheel 52 formed on the screw sleeve. In this manner, the tail-stock spindle can turn in the screw sleeve, but cannot move longitudinally independently of it. The turning of the hand wheel thus enables the toe dog 18 to be advanced toward or retracted from the heel dog, and thus enables model lasts of varying lengths to be clamped between the said two dogs.

A bracket 53 is journaled on the tail-stock spindle, being held against the hub of the gear 51, by means of a collar 54. The bracket 53 is prevented from rotating with the spindle by slidably engaging the guide bar 7 by a boss. The bell crank 48 is pivoted in arms 53ª on the bracket 53, and a horizontal arm 48ª of the bell crank is pivoted to the lower end of a link 56, whose upper end is pivoted to the free end of a segment lever 57, whose segment 57ª meshes with a gear 58 on a sleeve 58ª that is splined on a shaft 55. The shaft 55 has a bearing in the side frame 6, and carries a bevel gear 59 that meshes with a segment 60 formed on the lever 32.

A shaft 61 is journaled in the swing frame, and carries a pinion 62 which meshes with a gear 63 on the head-stock spindle and turns the latter. The shaft 61 also carries a long pinion 64 which meshes with the gear 51 on the tail-stock spindle, and turns the latter. The shaft 61 may be driven in any desired manner, for example, that usual in driving the dogs in the ordinary last lathe.

The parts are so proportioned that movement of the bell crank 32 to shift the headstock dog or heel dog will effect an equal movement of the tail-stock dog or toe dog, and thus the various positions of the model last will always be parallel with each other.

As before stated, I desire to maintain the last so that the portion of the sole being operated upon by the model-wheel shall always be at a uniform distance from the axis of revolution. This I accomplish by causing movement between a pin or shoulder on the rod 41 and a cam mounted preferably on the model carriage, which cam shall have the contour of the profile of the model last. In the present instance, the cam consists of a plate 65 having secured to it two pieces of material 66 and 67, which, between them, form a channel 68 having the desired profile of the sole of the last. The said cam can be formed without calculation by obtaining the profile of the sole of the last through sawing the last lengthwise, and then marking off the said profile on a single block or slab of material, and sawing the block in two along the line thus obtained and then fastening the two portions 66 and 67 thus obtained to the plate 65, separated the proper distance to form the cam channel desired. The blocks 66 and 67 may conveniently be formed of rock maple or other wood of which lasts are to be turned. The bar 41 is provided with a pin 69 having an antifriction roller 70 mounted thereon, which engages the cam groove. The plate 65 may be secured to the model-wheel carriage 1, as by a thumb screw 71. I have shown the plate 65 as secured to a slide 65ᵃ that is mounted in a slideway in the model carriage, such construction permitting both ready removal and interchange of cams for different models and adjustment of the cams to exactly correspond to the model. The blocks 66 and 67 should be so secured to the plate 65 that the longitudinal axis of a last having the sole profile defined by the cam channel 68 shall be parallel with the axis of the model last when the latter is supported by the heel and toe dogs. The block from which the new last is to be turned is held between dogs constructed and operated precisely like and mounted like those for the model and that likewise derive their motion and control from the shaft 55. In the broad aspect of my invention, I propose to keep the bottom point of the model section being reproduced at a uniform distance (not necessarily zero) from the rotation axis. Variation of this distance is accomplished by lateral shifting of the cam 66, 67 or can be accomplished as effectively by changing the length of the link 41, or by shifting the model parallel to itself when inserting it between its dogs. It is advantageous not to have to throw the swing frame through oscillations of too great amplitude. If the model sole is kept in the axis of rotation, the swing frame must swing a distance equal to the vertical diameter of the model at the section being reproduced, but if the axis is kept in the model, and at a constant distance from the sole, equal to, say the average diameter of the model, the oscillations of the swing frame will be comparable with those occurring in ordinary turning. This constant distance will be magnified by the width grader, but this will not affect the shape of the resulting profile.

In the use of the illustrated lathe in accordance with my invention in practising the method aspect thereof, the parts are so arranged that the roller 69 is always in engagement with the portion of the cam channel 68 corresponding to the portion of the sole of the model last being operated by the model-wheel, the roller traveling along the cam channel just as the model-wheel travels along the same portion of the sole of the model. The levers and crank arms are preferably so designed that a movement of the bar 41 is reproduced quantitatively in the movement of the four model and last dogs. The block from which the new last is to be turned, being moved toward and from the axis in the same way as and in synchronism with the model, the effect is that whenever the sole of the model is in engagement with the model-wheel, it is also in the axis of revolution, and the corresponding portion of the sole of the new last is likewise in the axis of revolution. The operation of the grading mechanisms is not affected as regards their magnifying effect.

When a new last is being formed in the lathe, either larger or smaller than the model, the building up or reduction at any point of the periphery of a cross section perpendicular to the axis of rotation is greater or less at any given point, depending upon the distance of that point from the axis of revolution. Therefore, by shifting the model and block so that the portion of the profile of the model being operated on by the model-wheel, and the corresponding portion of the new last being operated upon by the cutter, are always at a fixed distance from or in the axis of revolution, the amount of building up or reduction of the sole of the new last will either be a layer of uniform thickness or zero, so that the profile of the sole of the model will be exactly reproduced in the new last, and all the building up or reducing which is not thus uniform, will occur upon the upper side of the last away from the sole, where it should properly be. Thus the vertical height from the floor line of every portion of the sole of the new last is precisely the same as the corresponding portion in the model last. The height of the toe, the instep and the heel above the floor line will be the same in the new last as in the model, no matter what width of last is being turned from the model, and whether the new last be wider or narrower than the model. I preferably so mount the model between the heel and toe dogs that the floor line of the model shall be parallel with the axis of revolution, and of course the cam channel 68 is placed in parallel relation.

The essential condition for the most successful practice of my invention is only that the portion of the sole of the model being operated upon by the model wheel shall always be at the same distance from the axis of revolution. It is not necessary that the portion of the sole being operated upon by the model wheel shall be actually in the axis of revolution, so long as the various portions of the sole, as they are successively operated upon by the model wheel, are at a uniform distance from the axis of revolution.

The term "fixed distance from the axis of rotation", occurring in some of the claims, is meant to include zero or coincidence with the axis of rotation, as well as any positive or negative distance other than zero. The illustrated machine is described as keeping the bottom point of the model section being reproduced always in the axis of rotation, but the invention is not limited to such procedure.

I claim:

1. That improvement in the art of copy turning lasts which comprises so controlling the model that each point of a certain profile of the model shall be at the same distance from the axis of rotation at the instant when the model wheel is operating on the said point.

2. That improvement in the art of copy turning which comprises so controlling the model that the portion of the profile of the sole of the model which is being operated upon by the model wheel shall always be in the axis of rotation.

3. That improvement in the art of copy turning which comprises so shifting the model last bodily during the turning operation, that the portion of the profile of the sole of the model being operated upon by the model wheel, shall always be at a fixed distance from the axis of rotation, and similarly shifting the last being formed.

4. That improvement in the art of copy turning lasts which comprises so shifting the model last bodily during the turning operation as to compensate for variations which would otherwise occur in distances from the axis of rotation of the successive points of the profile of the sole of the last being operated upon by the model wheel, and similarly shifting the last being formed.

5. That improvement in the art of copy turning lasts which comprises shifting both the toe and heel of the model last to position the successive portions of a longitudinal profile of the last being operated upon by the model wheel at a uniform distance from the axis of rotation, and similarly shifting the last being formed.

6. That improvement in the art of copy turning lasts which comprises revolving the model last upon axis of rotation parallel with the floor line of the last, and shifting the centers of rotation of the toe and heel a distance equal to the height of the point of the profile of the last being operated upon by the model wheel above the floor line, and similarly shifting the last being formed.

7. That improvement in the art of copy turning lasts which comprises mounting a model and a block on rotatable means, and bodily shifting them on said means relatively to the axis of rotation by engagement of a cam which is the same shape as the profile of the sole of the model, by a part engaging said cam at a point corresponding to the point of engagement of the model wheel with said profile.

8. In a last turning lathe, the combination of a model wheel and cutter, means for rotating a model and block, and means for so moving the model and block that the portions of corresponding selected profiles of the model and of the block which are being operated upon by the model wheel and cutter, respectively, shall always be at a fixed distance from the axis of rotation.

9. In a last turning lathe, the combination of a model wheel and cutter, means for rotating a model and block, and means for so moving the model and block that the portions of the profiles of the soles of the model and of the block which are being operated upon by the model wheel and cutter, respectively, shall always be in the axis of rotation.

10. In a last turning lathe, the combination of a model wheel and cutter, means for rotating a model and block, and means for so shifting the model and block bodily during the turning operation that the portions of the profiles of the soles of the model and block being operated upon by the model wheel and cutter, respectively, shall always be at a fixed distance from the axis of rotation.

11. In a last turning lathe, the combination of a model wheel and cutter, means for rotating a model and block, and means for supporting both the model last and the block by the toe and heel, and means for shifting said supporting means of the model and block to position the successive portions of the profiles of the soles of the model and block being simultaneously operated upon by the model wheel and cutter, respectively, at a uniform distance from the axis of rotation.

12. In a last turning lathe, the combination of a model wheel and cutter, means for revolving the model and block upon axes parallel to the floor line of the last, and means for shifting the centers of rotation of the toe and heel of the model and block a distance differing only by a constant (which may be positive, negative or zero) from the height of the point of the profile of the last being operated upon by the model wheel above the floor line.

13. In a last turning lathe, the combination of a model wheel and cutter, means for rotating a model and block, a cam having the same shape as the profile of the sole of the last, a part engaging said cam at a point corresponding to the point of engagement of the model wheel with said profile, and connections between said part and said means for rotating said model and said block, for bodily shifting the model and block relatively to the axes of rotation.

14. In a pattern copying machine, means for holding a model and work, and means grading the work in relation to a grading axis for automatically shifting said model and work bodily relatively to the grading axis while preserving the pantographic features of the reproduction.

15. In a last turning lathe, means for rotating a model and block and means for automatically shifting the model and block bodily relatively to the axis of rotation at a variable rate, to alter the normal relation of progressively reproduced sections.

16. In a pattern copying machine, means for holding a model and work grading mechanism, and means for automatically shifting the model and work bodily relatively to a grading axis, by predeterminedly arbitrarily variable amounts.

17. In a last turning lathe, a model wheel carriage, a cutter carriage, a swing frame having centers for suspending and rotating a model and a block, dogs movably mounted on said centers for supporting one of said objects, a cam on one of said carriages, and a member mounted on the main frame of the lathe, engaging said cam and connected with said dogs, for bodily moving one of said objects relatively to the axis of rotation, the said connection comprising a chain of mechanism having a joint substantially in the pivotal axis of the swing frame.

18. In a last lathe, the combination of a model head-stock and tail-stock, a block head stock and tail stock, heel and toe dogs respectively mounted on the spindles thereof, and means for shifting all of said dogs simultaneously a distance perpendicular to the axis of rotation, to cause the model wheel, when operating on one side of the profile of the last, to always be at a fixed distance from the axis of rotation.

19. In a last turning lathe, the combination of a head-stock and a tail stock, means for rotating the spindles of both of said stocks, heel and toe dogs respectively mounted on said spindles and a cam operated mechanism for shifting said dogs on their respective spindles, comprising a part adjacent to the model wheel carriage, and a part of the model wheel carriage adapted to engage said first-mentioned part.

20. In a last turning lathe, the combination of a head-stock and a tail-stock, means for rotating the spindles of both of said stocks, heel and toe dogs respectively mounted on said spindles and a cam for shifting said dogs on their respective spindles, the cam having the shape of a selected profile of the model last being operated upon.

21. In a last turning lathe, the combination of a head-stock and a tail-stock, means for rotating the spindles of both of said stocks, heel and toe dogs respectively mounted on said spindles and a cam for shifting said dogs on their respective spindles, the cam having the shape of a longitudinal profile of the model last being operated upon, said cam lying parallel to the line of movement of a carriage, and a part adapted to engage said cam.

22. In a last turning lathe, the combination of a head-stock and a tail-stock, means for rotating the spindles of both of said stocks, heel and toe dogs respectively mounted on said spindles, and a cam for shifting said dogs on their respective spindles, the cam having the shape of a profile of the model last being operated upon, said cam lying parallel to the line of movement of the model wheel carriage, and a part adapted to engage said cam, said part being so positioned relatively to said cam that it shall engage said cam at points corresponding to the portion of the profile of the last engaged by the model wheel.

23. In a last lathe, guiding and cutting instrumentalities, model holding mechanism and block holding mechanism, constructed and arranged to revolve the model and block, and to present them to said instrumentalities respectively in similar relations, and means for bodily shifting the model and block relatively to their axes of rotation at a rate arbitrarily controllable along the length of a last.

24. In a last lathe, guiding and cutting instrumentalities, model holding mechanism and block holding mechanism, constructed and arranged to revolve the model and block, and to present them to said instrumentalities respectively in similar relations, and means for bodily shifting the model and block relatively to their axes of rotation at a rate variable automatically in any desired manner along the length of a last.

25. In a last lathe, guiding and cutting instrumentalities; model holding mechanism and block holding mechanism, constructed and arranged to revolve the model and block, and to present them to said instrumentalities respectively in similar relations, and means for bodily shifting the model and block, relatively to their axes of rotation at a rate variable according to any predetermined law along the length of the last during the uninterrupted cutting of a last.

26. In a last lathe, guiding and cutting instrumentalities, model holding mechanism and block holding mechanism, constructed and arranged to revolve the model and block, and to present them to said instrumentalities respectively in similar relations, and means for bodily shifting the model and block relatively to their axes of rotation automatically at a rate nonuniform during the cutting of a last, the change in position during a revolution being continuously in the same direction.

27. In a last turning lathe, a model wheel, a cutter, a frame having centers for supporting and rotating a model and a block in operating relation to said wheel and cutter, the centers of said objects comprising toe and heel dogs constructed and arranged to be moved relatively to the axis of rotation of said centers at a rate variable during the cutting of the last, the movement having a cycle extending over a plurality of revolutions of the model and block.

28. In a last turning lathe, a model wheel, a cutter, a swing frame having centers for supporting and rotating a model and a block in operating relation to said wheel and cutter, the centers of said objects comprising toe and heel dogs constructed and arranged to be moved relatively to the axis of rotation of said centers at a rate proportional to the slope of the tangent to a selected profile of one of the said rotated objects.

29. In a last turning lathe, model wheel and cutter carriages, centers for supporting and rotating a model and a block, dogs movably mounted on said centers for supporting said objects, and connections between one of said carriages and said dogs for moving said dogs relatively to the axis of said centers in the same sense for several revolutions during the cutting of a last.

30. In a last turning lathe, model wheel and cutter carriages, centers for supporting and rotating a model and block, dogs movably mounted on said centers for supporting said objects, and connections between one of said carriages and said dogs for moving said dogs relatively to the axis of said centers at a rate automatically controllable during the cutting of a last and unrelated to the rotation period.

31. In a last turning lathe, model wheel and cutter carriages, centers for supporting and rotating a model and block, dogs movably mounted on said centers for supporting said objects, and connections between one of said carriages and said dogs, comprising a member adjustably mounted on the carriage for moving said dogs relatively to the axis of the centers during the cutting of a last.

32. In a last turning lathe, model wheel and cutter carriages, centers for supporting and rotating a model and a block, dogs movably mounted on said centers for supporting said objects, and cam-operated means for moving said dogs relatively to the axis of said centers during the cutting of a last to alter the normal relations of reproduced differential elements.

33. In a last lathe, the combination of a model head-stock and tail-stock, heel and toe dogs respectively mounted on the spindles thereof, and means for shifting both of said dogs simultaneously a distance perpendicular to the axis of rotation, to cause the model wheel, when operating on a profile of the last, to always be at a fixed distance from the axis of rotation, and means for similarly and simultaneously supporting and shifting a block.

34. In a last turning lathe, the combination of head-stocks and tail-stocks for a model and block, means for rotating the spindles of said stocks simultaneously, heel and toe dogs respectively mounted thereon, and means for shifting said dogs simultaneously at a rate controllable along the length of the last, said mechanism being so constructed as to permit said dogs to be advanced toward and from each other to engage lasts of varying lengths.

35. In a last turning lathe, the combination of model wheel and cutter, model and block rotating instrumentalities comprising dogs for supporting said objects and movable toward and away from the axis of rotation during the cutting of a last, and a single cam for shifting said dogs simultaneously.

36. In a last turning lathe the combination of means for supporting and rotating a last, and means for shifting said last relatively to its axis of rotation, which means comprises a cam having the shape of a profile of the model last being operated upon.

37. In a last turning lathe the combination of means for supporting and rotating a last, and means for shifting said last relatively to its axis of rotation, which means comprises a cam having a shape which throughout its length has a uniform relation to the shape of a longitudinal profile of the model last being operated upon.

38. A cam for controlling movement of a last lathe dog transverse to its axis of rotation having the shape of a profile of the last.

39. In a last turning lathe the combination of means for supporting and rotating a last, width grading mechanism, and means for shifting said last relatively to its axis of rotation during the turning to shift successively reproduced sections of the last upon one another, said means for shifting said last being so constructed as automatically to shift such reproduced sections into position along the same profile irrespective of the setting of the grading mechanism.

40. In a last turning lathe the combination of means for supporting and rotating a model and block, width grading mechanism and a cam and connections for shifting reproduced sections of the model upon one another and arranging them in the block to fit a profile identical with a corresponding model profile fitted by their model prototypes, irrespective of the width grade.

41. In a last turning lathe the combination of means for supporting and rotating a last and a block, width grading mechanism, and means for automatically controlling the relative positions of said last and block, by a single adjustment, to differentially shift successively reproduced laminæ upon one another, constructed and arranged to produce the same sole profile irrespective of the width grade.

42. In a last turning lathe the combination of means for supporting and rotating a last and a block, width grading mechanism, and means for automatically controlling the relative positions of said last and block, by a single cam, to differentially shift successively reproduced laminæ upon one another, constructed and arranged to produce the same sole profile irrespective of the width grade.

43. In a machine of the class described, model rotating means comprising a dog shiftable transversely of the axis of rotation, dog shifting means, a member for controlling the action of the dog shifting means, an element moved by the main drive of the machine, the member and element being arranged for coöperation to operate the dog shifting means, the dog shifting means and the member being constructed and arranged to produce dog-movements substantially equal to corresponding member-movements.

44. In a last turning lathe, model wheel and cutter carriages, centers for supporting and rotating a model and block, dogs movably mounted on said centers for supporting one of said objects and connections between one of said carriages and said dogs, comprising a single member adjustably mounted on the carriage for moving said dogs relatively to the axis of the centers during the cutting of a last.

45. In a last turning lathe, the combination of a head-stock and a tail-stock, means for rotating the spindles of both of said stocks, heel and toe dogs respectively mounted on said spindles and a single cam for shifting both dogs on their respective stocks.

46. In a copy turning lathe, a model wheel and cutter, means comprising dogs for rotating a model and block, and means for producing relative traverses between the wheel and model and cutter and block, and a dog-shifting mechanism constructed and arranged to shift the dogs transverse to the axis of rotation in the plane of a selected longitudinal section of the last in such manner as to keep the profile points in the model and block in the laminæ being reproduced always at the same distance from the axis of rotation.

47. In a pattern copying machine, a grading mechanism for magnifying or reducing differential elements of the model with reference to a grading axis and means for displacing the model and work transverse to said axis by amounts equal to the radii of the elements, as they are reproduced.

48. In a pattern copying machine, a grading mechanism for magnifying or reducing differential elements of the model with reference to a grading axis and means tending to displace the model and work transverse to the axis, comprising a cam having the shape of a longitudinal outline of the model.

49. In a pattern copying machine, a grading mechanism for magnifying or reducing differential elements of the model transverse to a grading axis, and a cam and connections tending to relatively shift the model and work by amounts equal to the radii of the elements as they are being reproduced.

50. In a pattern copying machine, a grading mechanism for magnifying or reducing differential elements of the model in relation to a grading axis, a cam and connections tending to relatively shift the model and work by amounts equal to the radii of the elements as they are being reproduced.

51. In a pattern copying machine, a grading mechanism for magnifying or reducing differential elements of the model with relation to a grading axis, a cam and connections for relatively shifting the model and work transverse to the axis by amounts equal to the radii of the elements being reproduced plus or minus a constant (which may be zero.)

52. In a pattern copying machine, a grading mechanism for magnifying or reducing differential elements of the model in relation to a grading axis, a cam having the shape of a portion of a longitudinal outline of the model periphery, and connections for transmitting motion from said cam to the model to shift it relatively to the said axis.

53. In a pattern copying machine, a grading mechanism for magnifying or reducing differential elements of the model in relation to a grading axis, and a cam and connections for moving the model and block to place portions of corresponding peripheries of them in the grading axis during reproduction.

54. In a pattern copying machine, a grading mechanism for magnifying or reducing differential elements of the model in relation to a grading axis, and a cam and connections for moving the model and block to place points of corresponding peripheries of them at a constant distance from the grading axis during reproduction.

55. That improvement in the art of pattern copying which comprises so controlling the model that all points of a contour of the model are at a fixed distance (which may be zero) from a grading axis, at their respective instants of reproduction.

56. That improvement in the art of pattern copying which comprises so controlling the model and work that portions of corresponding contours of them at the instant of reproduction are at a fixed distance (which may be zero) from a grading axis.

In testimony that I claim the foregoing I have hereunto set my hand.

EDWIN J. PRINDLE.